US008085996B2

(12) United States Patent
Ogawa

(10) Patent No.: US 8,085,996 B2
(45) Date of Patent: Dec. 27, 2011

(54) IMAGE PROCESSING APPARATUS, IMAGE DISPLAY APPARATUS, IMAGING APPARATUS, METHOD FOR IMAGE PROCESSING THEREFOR, AND PROGRAM

(75) Inventor: Kaname Ogawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 894 days.

(21) Appl. No.: 12/104,036

(22) Filed: Apr. 16, 2008

(65) Prior Publication Data
US 2008/0304749 A1  Dec. 11, 2008

(30) Foreign Application Priority Data
Jun. 11, 2007  (JP) ................................ 2007-154386

(51) Int. Cl.
G06K 9/00  (2006.01)
G06K 9/46  (2006.01)
(52) U.S. Cl. .................. 382/118; 382/190; 382/201
(58) Field of Classification Search ............. 382/118, 382/218
See application file for complete search history.

(56) References Cited

U.S. PATENT DOCUMENTS

| | | | | |
|---|---|---|---|---|
| 6,895,103 | B2* | 5/2005 | Chen et al. | 382/117 |
| 7,577,310 | B2* | 8/2009 | Kinjo | 382/274 |
| 7,869,632 | B2* | 1/2011 | Akahori | 382/118 |
| 7,881,494 | B2* | 2/2011 | Kitamura | 382/103 |
| 7,912,253 | B2* | 3/2011 | Suzuki et al. | 382/118 |
| 2002/0015514 | A1* | 2/2002 | Kinjo | 382/118 |
| 2002/0102024 | A1* | 8/2002 | Jones et al. | 382/225 |
| 2005/0008246 | A1* | 1/2005 | Kinjo | 382/254 |
| 2006/0092292 | A1* | 5/2006 | Matsuoka et al. | 348/231.99 |
| 2006/0115157 | A1* | 6/2006 | Mori et al. | 382/190 |
| 2007/0076954 | A1* | 4/2007 | Terakawa | 382/190 |

FOREIGN PATENT DOCUMENTS

| | | |
|---|---|---|
| CN | 1794265 A | 6/2006 |
| EP | 1 536 369 A1 | 6/2005 |
| JP | 2002-288670 | 10/2002 |
| JP | 2005-78376 | 3/2005 |
| JP | 2007-28555 | 2/2007 |

OTHER PUBLICATIONS

U.S. Appl. No. 12/139,741, filed Jun. 16, 2008, Ogawa.
U.S. Appl. No. 12/190,998, filed Aug. 13, 2008, Ogawa.
Office Action issued Nov. 23, 2010 in China Application No. 200810100456.X (With English Translation).

* cited by examiner

*Primary Examiner* — Brian Werner
*Assistant Examiner* — Utpal Shah
(74) *Attorney, Agent, or Firm* — Oblon, Spivak, McClelland, Maier & Neustadt, L.L.P.

(57) ABSTRACT

An image processing apparatus includes the following elements. An evaluation information storage section stores a plurality of evaluation information sets for determinations as to whether an image subjected to determination is a target image. An image input section inputs an image. A face detection section detects a face included in the input image. A normalization section normalizes a face image that is an image segment including the detected face so that the face image has a predetermined resolution. A feature extraction section extracts a feature amount of the normalized face image. An attribute information generation section makes a determination on the basis of the extracted feature amount and each evaluation information set as to whether the face image is the target image associated with the evaluation information set, and generating an attribute information block related to the face included in the face image as the result of determination.

18 Claims, 10 Drawing Sheets

NORMALIZATION OK    NORMALIZATION NG

IMAGE PROCESSING APPARATUS, IMAGE DISPLAY APPARATUS, IMAGING APPARATUS, METHOD FOR IMAGE PROCESSING THEREFOR, AND PROGRAM

CROSS REFERENCES TO RELATED APPLICATIONS

The present invention contains subject matter related to Japanese Patent Application JP 2007-154386 filed in the Japanese Patent Office on Jun. 11, 2007, the entire contents of which are incorporated herein by reference.

BACKGROUND OF THE INVENTION

1. Field of the Invention

The present invention relates to image processing apparatuses and, in particular, to an image processing apparatus, an image display apparatus, and an imaging apparatus that are configured to detect a target object included in an image, a method for image processing for each apparatus, and a program that allows a computer to execute the method.

2. Description of the Related Art

In recent years, imaging apparatuses, such as a digital video camera and a digital still camera, have been widely diffused. In addition, there is an image processing apparatus capable of detecting the face of a person included in an image captured through such an imaging apparatus, generating various attribute information blocks related to the detected face, and displaying the detected face in various display modes using the attribute information blocks.

For example, the detected face is subjected to determinations, such as gender determination and facial expression (i.e., smiling/unsmiling) determination. Various attribute information blocks related to the detected face can be generated on the basis of the results of determinations. When a plurality of detected faces are displayed, for example, a list of the faces of women can be displayed using the attribute information blocks concerning gender.

To generate various attribute information blocks related to a detected face as described above, it is important to detect a high-accuracy face image in order to increase the accuracy of each attribute information block.

Japanese Unexamined Patent Application Publication No. 2005-78376 discloses an object detecting apparatus for detecting face candidates in an input image, detecting a non-face candidate from the detected face candidates on the basis of criteria, e.g., the difference between an estimated distance from the apparatus to each face candidate and a measured distance from the apparatus thereto, and removing the non-face candidate from the face candidates.

SUMMARY OF THE INVENTION

According to the above-described related art, even when an object other than a face is erroneously detected in an input image, a non-face candidate is removed from face candidates. Accordingly, the possibility of incorrect face detection can be reduced. Therefore, attribute information related to a face can be generated on the basis of a high-accuracy face image.

In this instance, to generate a plurality of attribute information blocks related to a detected face, for example, a plurality of processes for various determinations, e.g., gender determination and smiling/unsmiling determination, are performed independently. A plurality of attribute information blocks related to the detected face are generated on the basis of the results of determinations. Disadvantageously, the generation of the attribute information blocks related to the face leads to an increase in the complexity of the structure of the apparatus and an increase in generation time for the attribute information blocks.

Accordingly, it is desirable to efficiently generate a plurality of attribute information blocks related to a face included in an image.

The present invention is made in order to overcome the above-described disadvantages. According to a first embodiment of the present invention, an image processing apparatus includes the following elements. Evaluation information storage means stores a plurality of evaluation information sets for determinations as to whether an image subjected to determination is a target image. Image input means inputs an image. Face detection means detects a face included in the input image. Normalization means normalizes a face image that is an image segment including the detected face so that the face image has a predetermined resolution. Feature extraction means extracts a feature amount of the normalized face image. Attribute information generation means makes a determination on the basis of the extracted feature amount and each evaluation information set stored in the evaluation information storage means as to whether the face image is the target image associated with the evaluation information set, and generates an attribute information block related to the face included in the face image as the result of determination. Consequently, the first embodiment has an effect of normalizing an image segment (face image) including a face detected in an input image, making a determination on the basis of a feature amount of the normalized face image and each evaluation information set as to whether the face image is a target image, and generating an attribute information block related to the face as the result of determination.

In this embodiment, preferably, the evaluation information sets each include a combination of a position in an image subjected to determination and a threshold. The attribute information generation means may make a determination on the basis of the feature amount of the normalized face image corresponding to the position included in each evaluation information set and the threshold associated with the position as to whether the face image is the target image associated with the evaluation information set. Consequently, this embodiment has an effect of making a determination on the basis of a feature amount corresponding to the position included in each evaluation information set and the threshold associated with the position as to whether a face image is a target image.

In this embodiment, preferably, the evaluation information sets each include a combination of two positions in an image subjected to determination and a threshold. The attribute information generation means may calculate the difference between the feature amounts of the normalized face image corresponding to the two positions associated with the combination included in each evaluation information set, compare the calculated difference with the threshold associated with the combination, and make a determination on the basis of the result of comparison as to whether the face image is the target image associated with the evaluation information set. Consequently, this embodiment has an effect of calculating the difference between feature amounts corresponding to the two positions associated with the combination included in each evaluation information set, comparing the calculated difference with the threshold associated with the combination, and making a determination on the basis of the result of comparison as to whether a face image is a target image.

In this embodiment, preferably, the evaluation information sets each contain a plurality of combinations each including two positions in an image subjected to determination and a threshold. The attribute information generation means may calculate the difference between the feature amounts of the normalized face image corresponding to the two positions associated with each of the combinations contained in each evaluation information set, compare the calculated difference with the threshold associated with the combination, and make a determination on the basis of the results of comparisons as to whether the face image is the target image associated with the evaluation information set. Consequently, this embodiment has an effect of calculating the difference between feature amounts corresponding to the two positions associated with each of the combinations contained in each evaluation information set, comparing the calculated difference with the threshold associated with the combination, and making a determination on the basis of the results of comparisons as to whether a face image is a target image.

In this embodiment, preferably, the evaluation information sets each contain a plurality of combinations each including two positions in an image subjected to determination, a threshold, and a weight. The attribute information generation means may calculate the difference between the feature amounts of the normalized face image corresponding to the two positions associated with each of the combinations contained in each evaluation information set, compare the calculated difference with the threshold associated with the combination, add or subtract the weight on the basis of the result of comparison to obtain the sum of values associated with the combinations contained in the evaluation information set, and make a determination on the basis of the sum as to whether the face image is the target image associated with the evaluation information set. Consequently, this embodiment has an effect of calculating the difference between feature amounts corresponding to the two positions associated with each of the combinations contained in each evaluation information set, comparing the calculated difference with the threshold associated with the combination, adding or subtracting the weight associated with the combination on the basis of the result of comparison to obtain the sum of values associated with the combinations contained in the evaluation information set, and making a determination on the basis of the sum as to whether a face image is a target image associated with the evaluation information set.

In this embodiment, the feature extraction means may extract a brightness as the feature amount of the normalized face image. Consequently, this embodiment has an effect of extracting a brightness as a feature amount of a normalized face image.

In this embodiment, preferably, at least one of the plurality of evaluation information sets stored in the evaluation information storage means is a set of normalization determination information for a determination as to whether the normalization of the normalized face image is successful. The attribute information generation means may make a determination on the basis of the normalization determination information set stored in the evaluation information storage means as to whether the normalization of the normalized face image is successful, and generate an attribute information block related to the face included in the face image as the result of determination. Consequently, this embodiment has an effect of making a determination on the basis of the normalization determination information set as to whether the normalization of a normalized face image is successful, and generating an attribute information block related to a face included in the face image as the result of determination.

In this embodiment, when determining that the normalization of the normalized face image is unsuccessful, the attribute information generation means may stop generating another attribute information block related to the face included in the face image. Consequently, this embodiment has an effect of, when it is determined that the normalization of a normalized face image is unsuccessful, stopping generation of another attribute information block related to a face included in the face image.

In this embodiment, the apparatus may further include facial feature detection means for detecting at least one feature included in the detected face. The normalization means may normalize the face image of the detected face on the basis of the position of the detected feature. Consequently, this embodiment has an effect of detecting a feature included in a detected face and normalizing a face image of the detected face on the basis of the position of the detected feature.

In this embodiment, the facial feature detection means may include eye detection means for detecting both eyes of the detected face. The normalization means may normalize the face image of the detected face on the basis of the positions of the detected eyes. Consequently, this embodiment has an effect of detecting both eyes of a detected face and normalizing a face image of the detected face on the basis of the positions of the detected eyes.

In this embodiment, the normalization means may perform affine transformation on the face image of the detected face on the basis of the position of the detected feature. Consequently, this embodiment has an effect of performing affine transformation on a face image of a detected face on the basis of the position of a feature detected in the face.

In this embodiment, preferably, a plurality of attribute information blocks, generated by the attribute information generation means, include at least two of information blocks concerning the positions of both eyes of the face, the open/close states of the eyes, facial expression, gender, generation, ethnicity, a face shooting condition, and face orientation. Consequently, this embodiment has an effect of generating attribute information blocks as at least two of information blocks concerning the positions of both eyes of the face, the open/close states of the eyes, facial expression, gender, generation, ethnicity, a face shooting condition, and face orientation.

According to a second embodiment of the present invention, an image display apparatus includes the following elements. Evaluation information storage means stores a plurality of evaluation information sets for determinations as to whether an image subjected to determination is a target image. Image input means inputs an image. Face detection means detects a face included in the input image. Display means displays a face image that is an image segment including the detected face. Normalization means normalizes the face image so that the face image has a predetermined resolution. Feature extraction means extracts a feature amount of the normalized face image. Attribute information generation means makes a determination on the basis of the extracted feature amount and each evaluation information set stored in the evaluation information storage means as to whether the face image is the target image associated with the evaluation information set, and generates an attribute information block related to the face included in the face image as the result of determination. Display control means controls display of the face image on the display means on the basis of the generated attribute information blocks. Consequently, this embodiment has an effect of normalizing an image segment (face image) including a face detected in an input image, making a determination on the basis of a feature amount of the normalized face image and each evaluation information set as to whether the face image is a target image, generating an attribute information block related to the face as the result of determination, and controlling display of the face image on the basis of the attribute information blocks.

According to a third embodiment of the present invention, an imaging apparatus includes the following elements. Evaluation information storage means stores a plurality of evaluation information sets for determinations as to whether an image subjected to determination is a target image. Image input means inputs an image obtained by capturing an object. Face detection means detects a face included in the input image. Normalization means normalizes a face image that is an image segment including the detected face so that the face image has a predetermined resolution. Feature extraction means extracts a feature amount of the normalized face image. Attribute information generation means makes a determination on the basis of the extracted feature amount and each evaluation information set stored in the evaluation information storage means as to whether the face image is the target image associated with the evaluation information set, and generates an attribute information block related to the face included in the face image as the result of determination. Consequently, this embodiment has an effect of normalizing an image segment (face image) including a face detected in an input image, making a determination on the basis of a feature amount of the normalized face image and each evaluation information set as to whether the face image is a target face, and generating an attribute information block related to the face as the result of determination.

According to a fourth embodiment of the present invention, there is provided a method for image processing for an image processing apparatus including evaluation information storage means for storing a plurality of evaluation information sets for determinations as to whether an image subjected to determination is a target image. The method includes the steps of inputting an image, detecting a face included in the input image, normalizing a face image that is an image segment including the detected face so that the face image has a predetermined resolution, extracting a feature amount of the normalized face image, making a determination on the basis of the extracted feature amount and each evaluation information set stored in the evaluation information storage means as to whether the face image is the target image associated with the evaluation information set, and generating an attribute information block related to the face included in the face image as the result of determination.

According to a fifth embodiment of the present invention, there is provided a program that allows a computer to execute a method for image processing for an image processing apparatus including evaluation information storage means for storing a plurality of evaluation information sets for determinations as to whether an image subjected to determination is a target image. The method includes the steps of inputting an image, detecting a face included in the input image, normalizing a face image that is an image segment including the detected face so that the face image has a predetermined resolution, extracting a feature amount of the normalized face image, making a determination on the basis of the extracted feature amount and each evaluation information set stored in the evaluation information storage means as to whether the face image is the target image associated with the evaluation information set, and generating an attribute information block related to the face included in the face image as the result of determination.

The embodiments of the present invention have an advantage in that a plurality of attribute information blocks related to a face included in an image can be efficiently generated.

DESCRIPTION OF THE PREFERRED EMBODIMENTS

An embodiment of the present invention will be described in detail below with reference to the drawings.

Figure 1:
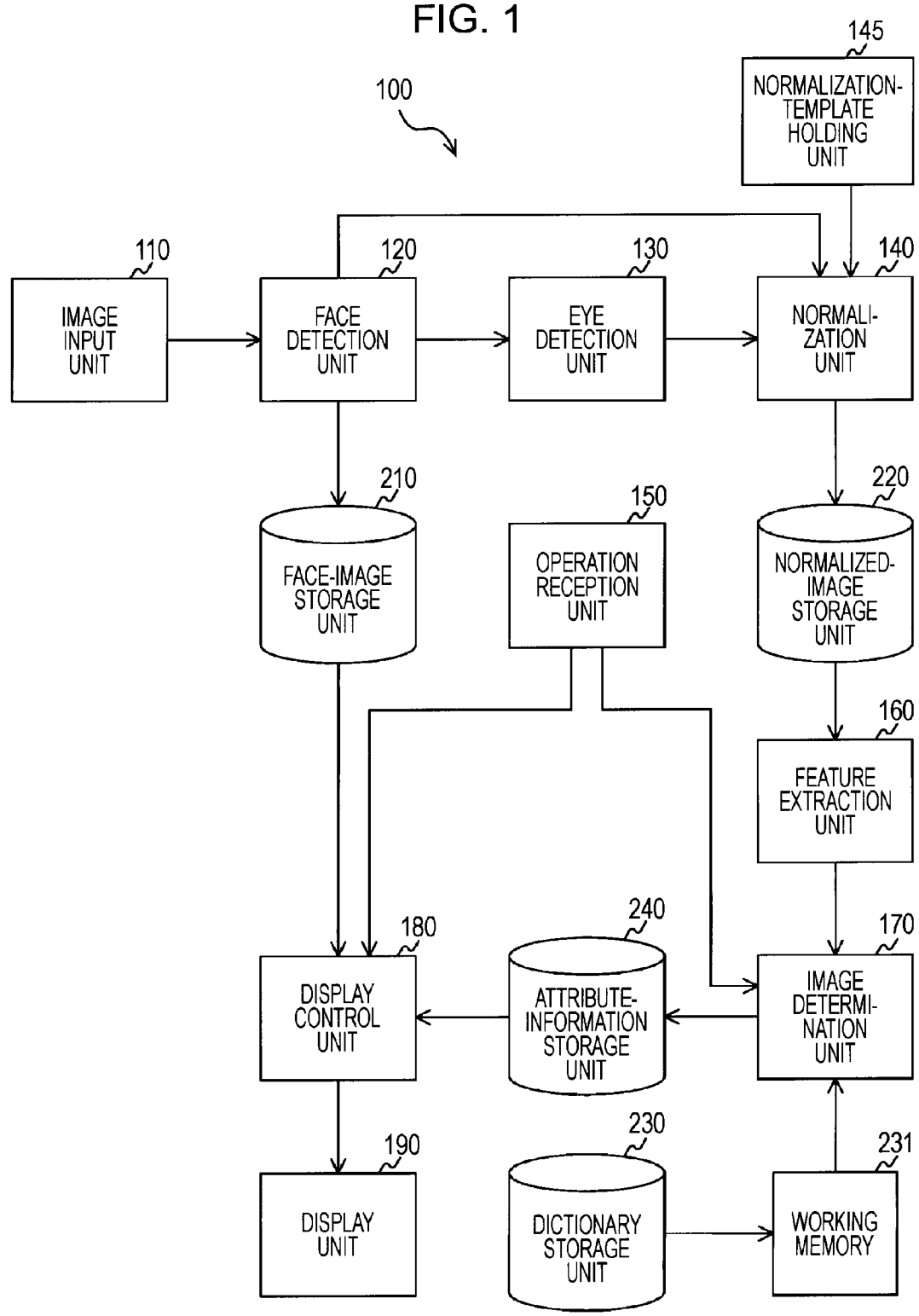
FIG. 1 is a block diagram of the functional structure of an image processor 100 according to an embodiment of the present invention.

FIG. 1 is a block diagram of the functional structure of an image processor 100 according to an embodiment of the present invention. The image processor 100 includes an image input unit 110, a face detection unit 120, an eye detection unit 130, a normalization unit 140, a normalization-template holding unit 145, an operation reception unit 150, a feature extraction unit 160, an image determination unit 170, a display control unit 180, a display unit 190, a face-image storage unit 210, a normalized-image storage unit 220, a dictionary storage unit 230, a working memory 231, and an attribute-information storage unit 240. The image processor 100 can be realized by a personal computer capable of performing various image processes on an image captured through, for example, a digital video camera or a digital still camera.

The image input unit 110 inputs or receives an image, such as a moving image or a still image, captured through a digital video camera or a digital still camera, and outputs the input image to the face detection unit 120.

Figure 5A:
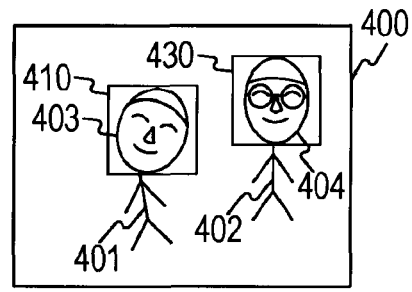
FIGS. 5A to 5C are diagrams schematically showing transitions of normalized face images generated from an image 400, the face images being subjected to a determination as to whether normalization is successful.

The face detection unit 120 detects a face included in the input image supplied from the image input unit 110 and outputs a face image, serving as an image segment including the detected face in the input image, to the eye detection unit 130, the normalization unit 140, and the face-image storage unit 210. When the input image supplied from the image input unit 110 includes a plurality of faces, the face detection unit 120 detects the faces. For example, when an image 400 includes the faces 403 and 404 of two persons 401 and 402 as shown in FIG. 5A, the faces 403 and 404 are detected. Face images 410 and 430 including the detected faces 403 and 404 are output to the eye detection unit 130, the normalization unit 140, and the face-image storage unit 210.

The eye detection unit 130 detects both eyes included in the face image output from the face detection unit 120, and outputs information about the positions of the detected eyes in the face image to the normalization unit 140. For example, the eye positions, indicated by dotted crosses 411 and 412, are detected in the face 403 included in the face image 410 shown in FIG. 5B.

Figure 2A:
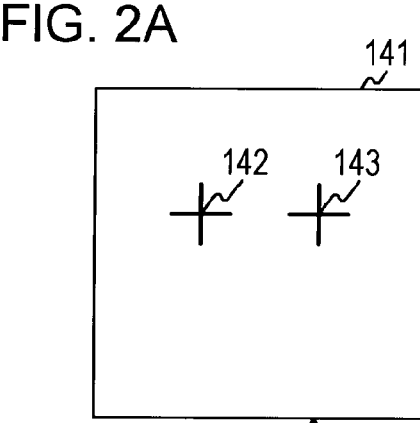
FIGS. 2A and 2B are diagrams illustrating an example of normalization of a face image.

The normalization unit 140 normalizes the face image output from the face detection unit 120 on the basis of the information about the positions of both the eyes in the face image, the information being output from the eye detection unit 130. The normalization-template holding unit 145 holds a normalization template used upon normalization by the normalization unit 140. The normalization template may include, for example, a template in which the positions of both eyes in a face image are uses as a reference set, as shown in FIG. 2A. The normalization unit 140 changes the resolution of the face image output from the face detection unit 120 and rotates the face image so that the positions of the eyes, detected by the eye detection unit 130, match the reference eye positions in the normalization template held by the normalization-template holding unit 145, thus normalizing the face image. The normalized face image is output to the normalized-image storage unit 220 and is stored into the unit 220. The normalization of the face image and the normalization template will be described later with reference to FIGS. 2A and 2B.

The operation reception unit 150 includes various operation keys. When receiving an operation input through any of those keys, the operation reception unit 150 outputs information indicating the received operation input to the image determination unit 170 and the display control unit 180. The operation reception unit 150 includes, for example, an attribute-information generation key for an instruction to generate attribute information related to a face and a face-image display key for an instruction to display a face image stored in the face-image storage unit 210 on the display unit 190. The operation reception unit 150 may be incorporated into the display unit 190 to realize a touch panel.

The feature extraction unit 160 extracts the brightnesses of respective parts as the amounts of features (hereinafter, feature amounts) of a normalized face image, which has been normalized by the normalization unit 140 and been stored in the normalized-image storage unit 220, and outputs the extracted brightnesses to the image determination unit 170.

The working memory 231 stores one of dictionaries for determinations (hereinafter, determination dictionaries) stored in the dictionary storage unit 230 and outputs the contents of the stored determination dictionary to the image determination unit 170. The determination dictionaries stored in the dictionary storage unit 230 will be described later with reference to FIG. 3.

The image determination unit 170 determines a normalized face image, which has been normalized by the normalization unit 140 and been stored in the normalized-image storage unit 220, using the brightnesses extracted by the feature extraction unit 160 and one determination dictionary stored in the working memory 231. The image determination unit 170 outputs the result of determination as attribute information related to the face to the attribute-information storage unit 240. Attribute information, related to a face, generated on the basis of the result of determination by the image determination unit 170 will be described in detail with reference to FIGS. 6A to 7.

When the operation reception unit 150 receives an operation input indicative of an instruction to display a face image on the display unit 190, the display control unit 180 controls the display unit 190 to display face images stored in the face-image storage unit 210, using attribute information blocks stored in the attribute-information storage unit 240.

The display unit 190 displays face images stored in the face-image storage unit 210 under the control of the display control unit 180.

The face-image storage unit 210 stores a face image output from the face detection unit 120 and outputs stored face images to the display control unit 180.

The normalized-image storage unit 220 stores a normalized face image output from the normalization unit 140 and outputs stored normalized face images to the feature extraction unit 160.

The dictionary storage unit 230 stores a plurality of determination dictionaries for determinations on any of the normalized face images stored in the normalized-image storage unit 220, the determinations being performed by the image determination unit 170. The stored determination dictionaries are sequentially output to the working memory 231. Those determination dictionaries will be described in detail later with reference to FIG. 3.

The attribute-information storage unit 240 stores attribute information related to a face, the information being generated by the image determination unit 170. The attribute-information storage unit 240 outputs stored attribute information blocks related to faces to the display control unit 180. The attribute information blocks related to the faces will be described in detail below with reference to FIGS. 6A to 7.

Figure 2B:
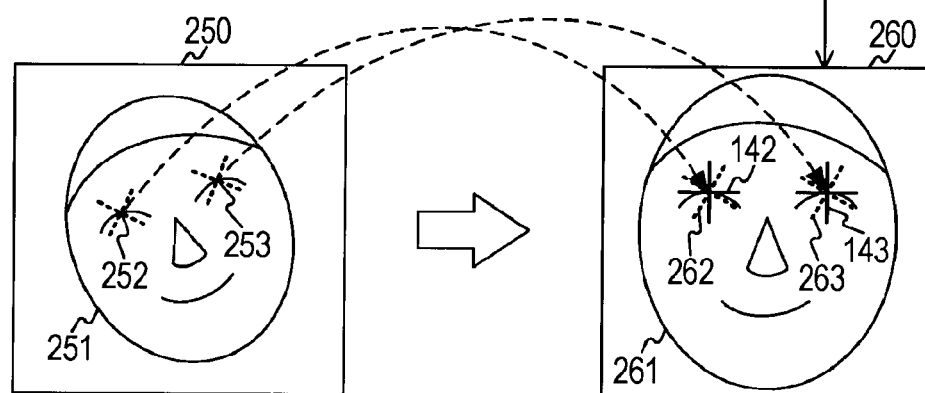

FIGS. 2A and 2B are diagrams illustrating an example of normalization of a face image. FIG. 2A shows a normalization template 141 for normalizing a face image. FIG. 2B illustrates a transition of a face image 250 which includes a face 251 detected by the face detection unit 120. The normalization template 141 is held by the normalization-template holding unit 145 and is used for normalization by the normalization unit 140. In the normalization template 141, reference positions 142 and 143, serving as a reference set for normalization, are defined. The following description relates to a case where the resolution of the face image is changed and the face image is rotated so that the positions of both eyes, detected by the eye detection unit 130, in the face image match the reference positions 142 and 143 in the normalization template 141.

The face image 250 including the face 251 detected by the face detection unit 120 is an image segment of an image input to the image input unit 110. The positions of both eyes (hereinafter, eye positions 252 and 253) in the face image 250 are detected by the eye detection unit 130. In the present embodiment of the present invention, it is assumed that the center of each eye is set to the eye position. In the case where the eye positions 252 and 253 in the face image 250 are detected as described above, the eye positions 252 and 253 are transformed by, for example, affine transformation so that the eye positions 252 and 253 match the reference positions 142 and 143 in the normalization template 141 shown in FIG. 2A. For example, when the resolution of the face image 250 is changed and the face image 250 is rotated as shown in FIG. 2B, the face image 250 is normalized to generate a normalized face image 260. In the normalized face image 260, eye positions 262 and 263 match the respective reference positions 142 and 143 in the normalization template 141 shown in FIG. 2A. In the present embodiment of the present invention, it is assumed that the resolution of a face image is changed to 48×48 pixels to generate a normalized face image.

As for reference positions, the position of another feature other than the eyes of a face may be used. For example, the nose of the face may be detected and the face image may be normalized on the basis of the position of the nose. The positions of features of the face may be used as reference positions. For example, the positions of the eyes and that of the nose may be used.

Figure 3:
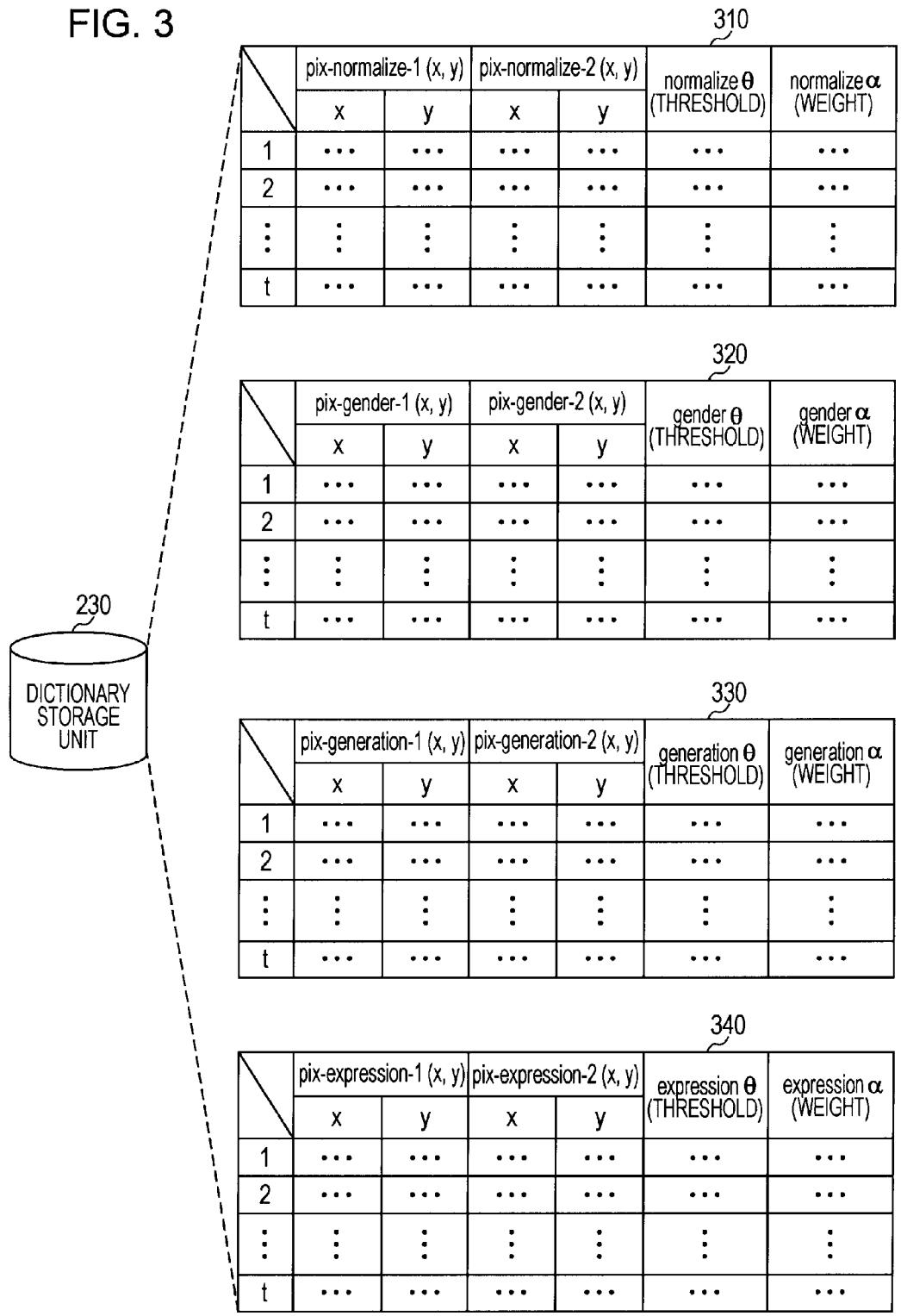
FIG. 3 is a diagram illustrating a plurality of determination dictionaries for various determinations performed on a normalized face image.

FIG. 3 illustrates a plurality of determination dictionaries for respective determinations to be performed on a normalized face image. Those determination dictionaries function as evaluation information sets for the respective determinations to be performed on a normalized face image stored in the normalized-image storage unit 220, the determinations being performed by the image determination unit 170. The determination dictionaries are stored in the dictionary storage unit 230. In the present embodiment of the present invention, it is assumed that the determination dictionaries include a normalization determination dictionary 310, a gender determination dictionary 320, a generation (adult/child) determination dictionary 330, and a facial expression (smiling/unsmiling) determination dictionary 340.

Each determination dictionary stores t combinations of data elements. Data elements of each combination indicate two positions pix-1 $(x, y)$ and pix-2 $(x, y)$ in a normalized image, a threshold θ for the difference between the brightness at the position pix-1 $(x, y)$ and that at the position pix-2 $(x, y)$, and a weight a to be added or subtracted on the basis of the result of comparison between the threshold θ and the difference between the brightness at the position pix-1 $(x, y)$ and that at the position pix-2 (x, y). Those values of respective data elements are set using the most effective top 100 combinations of data elements obtained by a machine learning algorithm, such as AdaBoost. Since the respective determination dictionaries have the same structure as described above, a plurality of determinations can be performed according to the same algorithm. Referring to FIG. 3, the data elements "pix-1 (x, y)", "pix-2 $(x, y)$", "θ", and "α" in the respective dictionaries are expressed by different notations. For example, in the normalization determination dictionary 310, a data element "pix-1 $(x, y)$" is expressed as "pix-normalize-1 $(x, y)$", a data element "pix-2 $(x, y)$" is expressed as "pix-normalize-2 $(x, y)$", a data element "θ" is expressed as "normalize θ", and a data element "α" is expressed as "normalize α".

A case where a normalized face image is subjected to determinations using the determination dictionaries will now be described in detail with reference to FIG. 4.

Figure 4:
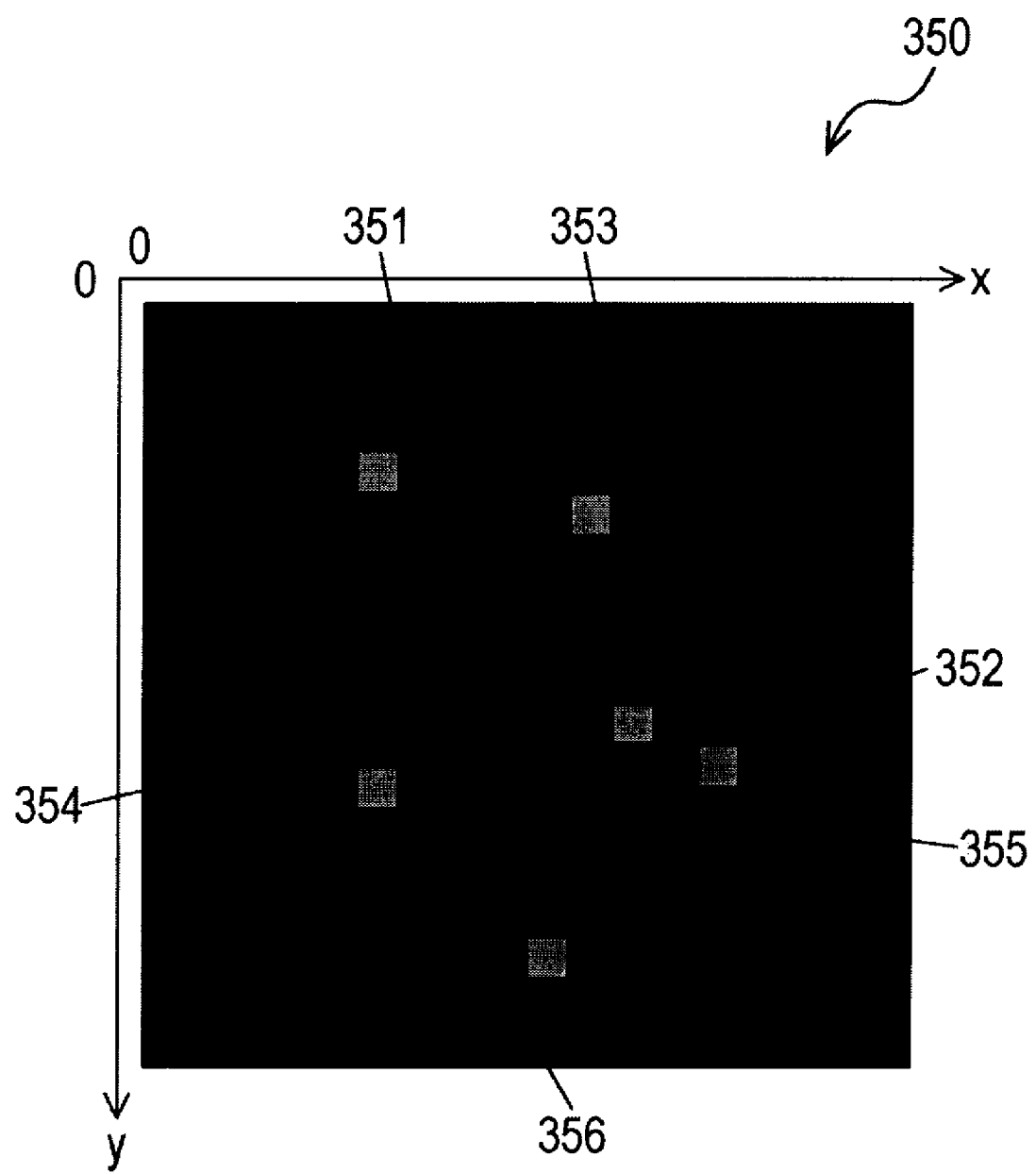
FIG. 4 is a diagram showing a face image normalized by a normalization unit 140.

FIG. 4 shows a normalized face image 350 as an example of a face image normalized by the normalization unit 140. In this example, it is assumed that the origin is defined at the left upper corner of the normalized face image 350 in FIG. 4, the horizontal axis is set to the x axis, the vertical axis is set to the y axis, and the normalized face image 350 is subjected to a determination with the normalization determination dictionary 310 (refer to FIG. 3). In the normalized face image 350, for example, a position 351 is set as a position corresponding to the value of the data element "pix-normalize-1 $(x, y)$" stored in the first row of the normalization determination dictionary 310. A position 352 is set as a position corresponding to the value of the data element "pix-normalize-2 $(x, y)$" stored in the first row thereof. A position 353 is set as a position corresponding to the value of the data element "pix-normalize-1 $(x, y)$" stored in the second row thereof. A position 354 is set as a position corresponding to the value of the data element "pix-normalize-2 $(x, y)$" stored in the second row thereof. A position 355 is set as a position corresponding to the value of the data element "pix-normalize-1 $(x, y)$" stored in the third row thereof. A position 356 is set as a position corresponding to the value of the data element "pix-normalize-2 $(x, y)$" stored in the third row thereof.

First, zero is set as the value of a score S for determination, and calculation is performed using the respective values of the data elements stored in the first row of the normalization determination dictionary 310. Specifically, a brightness A(1) in the position 351 corresponding to the value of the data element "pix-normalize-1 $(x, y)$" stored in the first row of the normalization determination dictionary 310 and a brightness B(1) in the position 352 corresponding to the value of the data element "pix-normalize-2 $(x, y)$" stored in the first row thereof are extracted. The difference C(1) between the extracted brightnesses is calculated using the following expression.

$$C(1)=A(1)-B(1)$$

Subsequently, the calculated difference C(1) between the brightnesses is compared to the value of the data element "normalize θ" indicative of the threshold stored in the first row of the normalization determination dictionary 310. In other words, whether the value of the difference C(1) is smaller than that of the threshold "normalize θ" is determined. When the difference C(1) is smaller than the threshold "normalize θ", the value of the data element "normalize α" indicative of the weight stored in the first row of the normalization determination dictionary 310 is added to the score S. On the other hand, when the difference C(1) is not smaller than the threshold "normalize θ", the weight "normalize α" in the first row of the normalization determination dictionary 310 is subtracted from the score S.

After that, the above-described calculations are repeated using the respective values of the data elements stored in the second row of the normalization determination dictionary 310. Specifically, a brightness A(2) in the position 353 corresponding to the value of the data element "pix-normalize-1 $(x, y)$" stored in the second row of the normalization determination dictionary 310 and a brightness B(2) in the position 354 corresponding to the value of the data element "pix-normalize-2 $(x, y)$" stored in the second row thereof are extracted. The difference C(2) between the extracted brightnesses is calculated using the following expression.

$$C(2)=A(2)-B(2)$$

Subsequently, the calculated difference C(2) between the brightnesses is compared to the value of the threshold "normalize θ" stored in the second row of the normalization determination dictionary 310. In other words, whether the calculated difference C(2) is smaller than the threshold "normalize θ" is determined. When the difference C(2) is smaller than the threshold "normalize θ", the weight "normalize α" stored in the second row of the normalization determination dictionary 310 is added to the score S. On the other hand, when the difference C(2) is not smaller than the threshold "normalize θ", the weight "normalize α" in the second row of the normalization determination dictionary 310 is subtracted from the score S.

After that, the above-described calculations are repeated using the respective values of the data elements in each of the third to t-th rows of the normalization determination dictionary 310.

In other words, to make a determination on the normalized face image 350 using the normalization determination dictionary 310, the difference C(i) is calculated with the following Expression (1) using the respective values of the data elements stored in each of the first to t-th rows of the normalization determination dictionary 310. Whether the calculated difference C(i) satisfies the following Expression (2) is determined. In this instance, the variable i is an integer ranging from 1 to t.

$$C(i)=A(i)-B(i) \quad (1)$$

$$C(i)<\theta(i) \quad (2)$$

When the calculated difference C(i) satisfies Expression (2), the weight α(i) is added to the score S. When the calculated difference C(i) does not satisfy Expression (2), the weight α(i) is subtracted from the score S. In this instance, let A(i) be a brightness corresponding to the data element "pix-normalize-1 (x, y)" stored in the i-th row, let B(i) be a brightness corresponding to the data element "pix-normalize-2 (x, y)" stored in the i-th row, let θ(i) be a threshold "normalize θ" stored in the i-th row, and let α(i) be a weight "normalize α" stored in the i-th row.

After calculations using the respective values of the data elements stored in the t-th row of the normalization determination dictionary 310, whether the score S is greater than 0 is determined.

For example, it is assumed that a learning sample obtained upon successful normalization determination is learned as a positive value and a learning sample obtained upon unsuccessful normalization determination is learned as a negative value according to the above-described machine learning algorithm. After completion of the calculations using the respective values of the data elements stored in the first to t-th rows of the normalization determination dictionary 310, when the score S is greater than 0, a normalized face image subjected to the determination is determined as a target image. In other words, in the determination with the normalization determination dictionary 310, a normalized face image subjected to the determination is determined as a successfully normalized image. The same applies to the other determination dictionaries. For example, in a determination with the gender determination dictionary 320, assuming that a learning sample obtained upon determination that a face is successfully determined as a male face is learned as a positive value, when the score S is greater than 0, the face included in a normalized face image subjected to the determination is determined as a male face. Furthermore, in a determination with the generation determination dictionary 330, assuming that a learning sample obtained upon determination that a face is successfully determined as an adult face is learned as a positive value, when the score S is greater than 0, the face included in a normalized face image subjected to the determination is determined as an adult face. In addition, in a determination with the facial expression determination dictionary 340, assuming that a learning sample obtained upon determination that the expression of a face is successfully determined as a smiling face is learned as a positive value, when the score S is greater than 0, the face included in a normalized face image subjected to the determination is determined as a smiling face.

On the other hand, assuming that a learning sample obtained upon successful determination is learned as a positive value and a learning sample obtained upon unsuccessful determination is learned as a negative value according to the above-described machine learning algorithm, when the score S is greater than 0 after completion of the calculations using the respective values of the data elements stored in the first to t-th rows of the determination dictionary, a normalized face image subjected to the determination is determined as a non-target image. For example, in a determination using the normalization determination dictionary 310, assuming that a learning sample of successful normalization determination is learned as a positive value, when the score S is less than 0, a normalized face image subjected to the determination is determined as an unsuccessfully normalized image. In addition, in a determination using the gender determination dictionary 320, assuming that a learning sample of successful male determination is learned as a positive value, when the score S is less than 0, the face included in a normalized face image subjected to the determination is determined as a female face. In a determination using the generation determination dictionary 330, assuming that a learning sample of successful adult determination is learned as a positive value, when the score S is less than 0, the face included in a normalized face image subjected to the determination is determined as a child face. In a determination using the facial expression determination dictionary 340, assuming that a learning sample of successful smiling determination is learned as a positive value, when the score S is less than 0, the face included in a normalized face image subjected to the determination is determined as an unsmiling face. In the present embodiment of the present invention, the explanation is made with respect to the case where the score S is compared to 0 in a determination using any of the determination dictionaries. A value other than zero may be used for determination. In other words, a value to be compared to the score S may be appropriately adjusted.

In this instance, the score S, obtained after completion of the calculations using the respective values of the data elements stored in each of the first to t-th rows of the determination dictionary, can be expressed as the following equation.

$$S = \sum_{i=1}^{t} [\text{sign}(\theta(i) - pix1(i) + pix2(i)) \times \alpha(i)]$$

The above-described equation represents a function s(x) that is equal to 1 when x>0, and is equal to −1 when x≦0.

As described above, the resolution of a normalized image subjected to determination is set to the same value, and a feature amount for determination is standardized to the difference between brightnesses at two points of the normalized image. Consequently, any of the determination dictionaries can be switched to another one. A plurality of attribute information blocks can be generated according to the same algorithm.

Figure 5B:
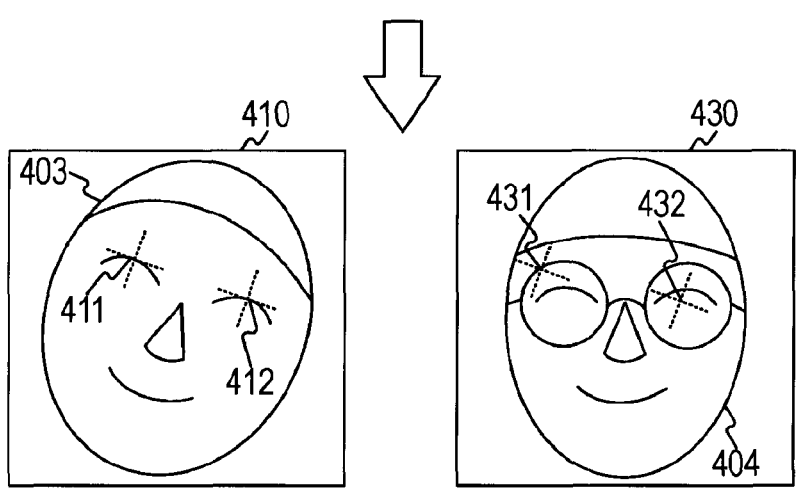
Figure 5C:
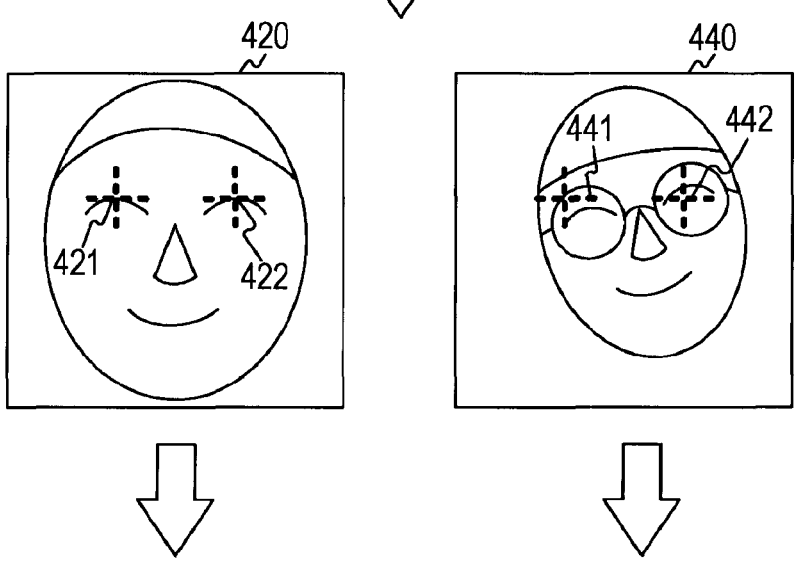

FIGS. 5A to 5C are diagrams schematically showing transitions of normalized face images generated from the image 400, the images being subjected to a determination as to whether normalization is successful. It is assumed that the image 400 is a still image captured through, for example, a digital still camera and includes the two persons 401 and 402.

FIG. 5A shows the image 400 including the persons 401 and 402. Referring to FIG. 5A, the faces 403 and 404 of the persons 401 and 402 included in the image 400 are surrounded by square frames, respectively. Image segments surrounded by the respective frames serve as the face images 410 and 430. It is assumed that both of the persons 401 and 402 are adult men and they are smiling.

FIG. 5B shows the face images 410 and 430 extracted from the image 400. Referring to FIG. 5B, the positions of eyes detected in the face image 410 are designated by the dotted crosses 411 and 412, respectively, and those in the face image 430 are designated by dotted crosses 431 and 432, respectively. It is assumed that the eye positions (designated by the dotted crosses 411 and 412) in the face image 410 have been correctly detected. Furthermore, it is assumed that parts of glasses have been erroneously detected as eyes in the face image 430 and the positions of eyes are not correctly designated using the dotted crosses 431 and 432.

FIG. 5C shows normalized face images 420 and 440 obtained by normalizing the face images 410 and 430 shown in FIG. 5B. In FIG. 5C, dotted crosses 421 and 422 designate respective positions corresponding to the eye positions detected in the face image 410 in FIG. 5B and dotted crosses 441 and 442 indicate respective positions corresponding to the eye positions detected in the face image 430. Referring to FIG. 5C, since the eye positions (indicated by the dotted crosses 411 and 412 in FIG. 5B) in the face image 410 are correctly detected, the face image 410 is successfully normalized. Whereas, the face image 430 is unsuccessfully normalized because the incorrect eye positions (designated by the dotted crosses 431 and 432 in FIG. 5B) are detected. As described above, when both eyes in a face image are correctly detected, the possibility of successful normalization of the face image is high. Whereas, when both eyes in the face image are incorrectly detected, the possibility of unsuccessful normalization thereof is high.

When a determination is made using the normalization determination dictionary 310 as to whether the normalization of each of the normalized face images 420 and 440 in FIG. 5C is successful, the normalized face image 420 is determined as successful normalization and the other normalized face image 440 is determined as unsuccessful normalization. As for the normalized face image determined as unsuccessful normalization, other determinations may be aborted and generation of another attribute information block related to the relevant face may be stopped.

Figure 6A:
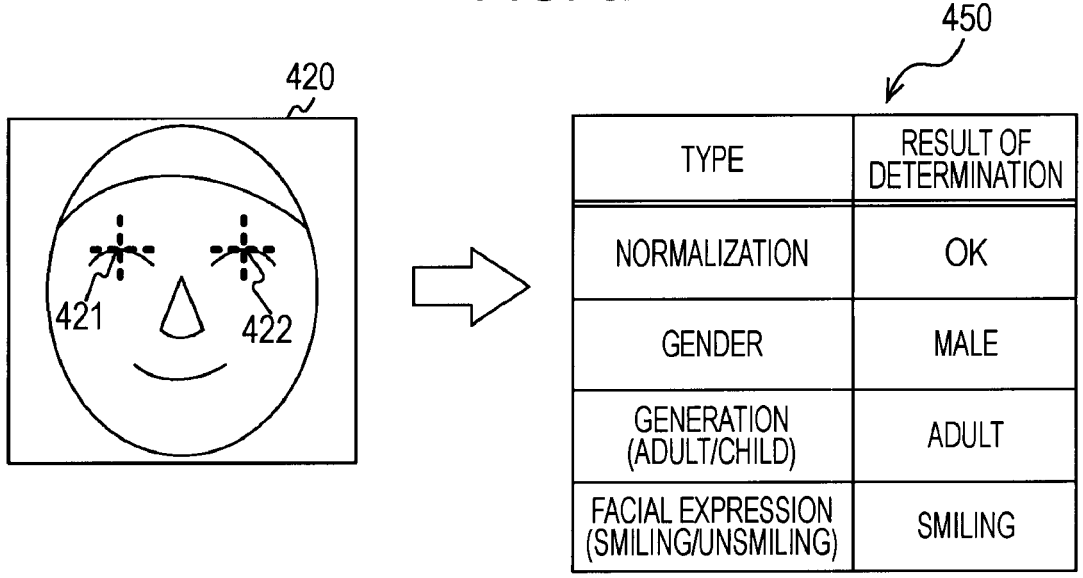
FIG. 6A shows a normalized face image 420 and a set 450 of attribute information blocks indicating the results of determinations on the normalized face image 420.
Figure 6B:
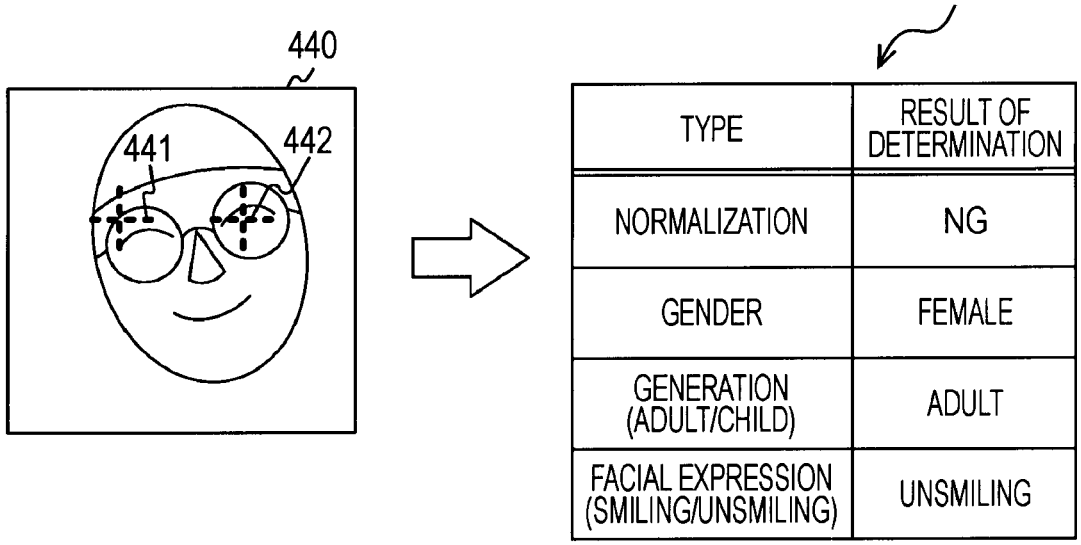
FIG. 6B shows a normalized face image 440 and a set 460 of attribute information blocks indicating the results of determinations on the normalized face image 440.

FIGS. 6A and 6B show attribute information sets 450 and 460 related to the normalized face images 420 and 440 in FIG. 5C, the attribute information sets 450 and 460 containing the results of determinations on the respective face images using the normalization determination dictionary 310, the gender determination dictionary 320, the generation determination dictionary 330, and the facial expression determination dictionary 340. The attribute information sets 450 and 460 each contain the results of determinations as attribute information blocks related to the faces (the types of determination are "normalization", "gender", "generation (adult/child)" and "facial expression (smiling/unsmiling)").

As for a determination regarding "normalization", an attribute information block indicating "OK" or "NG" is stored. For example, since the normalization of the normalized face image 420 is successful, the attribute information block "OK" is stored as the result of normalization determination using the normalization determination dictionary 310, as shown in FIG. 6A. Whereas, since the normalization of the normalized face image 440 is unsuccessful, the attribute information block "ING" is stored as the result of normalization determination using the normalization determination dictionary 310, as shown in FIG. 6B.

As for a determination regarding "gender", an attribute information block indicating "male" or "female" is stored. For example, since the normalization of the normalized face image 420 is successful, the attribute information block "male" is stored as the result of gender determination using the gender determination dictionary 320, as shown in FIG. 6A. On the other hand, since the normalization of the normalized face image 440 is unsuccessful, the attribute information block "female" is stored as the result of gender determination using the gender determination dictionary 320 though the person corresponding to the normalized face image 440 is the man.

As for a determination regarding "generation (adult/child)", an attribute information block indicating "adult" or "child" is stored. For example, since the normalization of the normalized face image 420 is successful, the attribute information block "adult" is stored as the result of generation determination using the generation determination dictionary 330, as shown in FIG. 6A. On the other hand, although the normalization of the normalized face image 440 is unsuccessful, the attribute information block "adult" is stored as the result of generation determination using the generation determination dictionary 330, as shown in FIG. 6B.

As for determination regarding "facial expression (smiling/unsmiling)", an attribute information block indicating "smiling" or "unsmiling" is stored. For example, since the normalization of the normalized face image 420 is successful, the attribute information block "smiling" is stored as the result of facial expression determination using the facial expression determination dictionary 340, as shown in FIG. 6A. On the other hand, since the normalization of the normalized face image 440 is unsuccessful, the attribute information block "unsmiling" is stored as the result of facial expression determination using the facial expression determination dictionary 340 through the person corresponding to the normalized face image 440 is smiling.

As described above, the accuracy of determination is high in successful normalization. In many cases, however, the accuracy of determination is low in unsuccessful normalization. Accordingly, attribute information generated on the basis of the result of determination may be used as follows: when a face image has an attribute information set containing, for example, attribute information indicative of "OK" as the result of normalization determination, the attribute information set is used in various applications, and whereas, when a face image has an attribute information set containing attribute information indicative of "NG" as the result of normalization determination, the attribute information set is not used in various applications. In addition, the value of the score S calculated on the basis of the determinations may be stored and the usage of the attribute information set may be changed in accordance with the score S. Furthermore, a flag indicating low reliability may be stored in association with a face image corresponding to a normalized face image determined as an unsuccessfully normalized face image.

Figure 7:
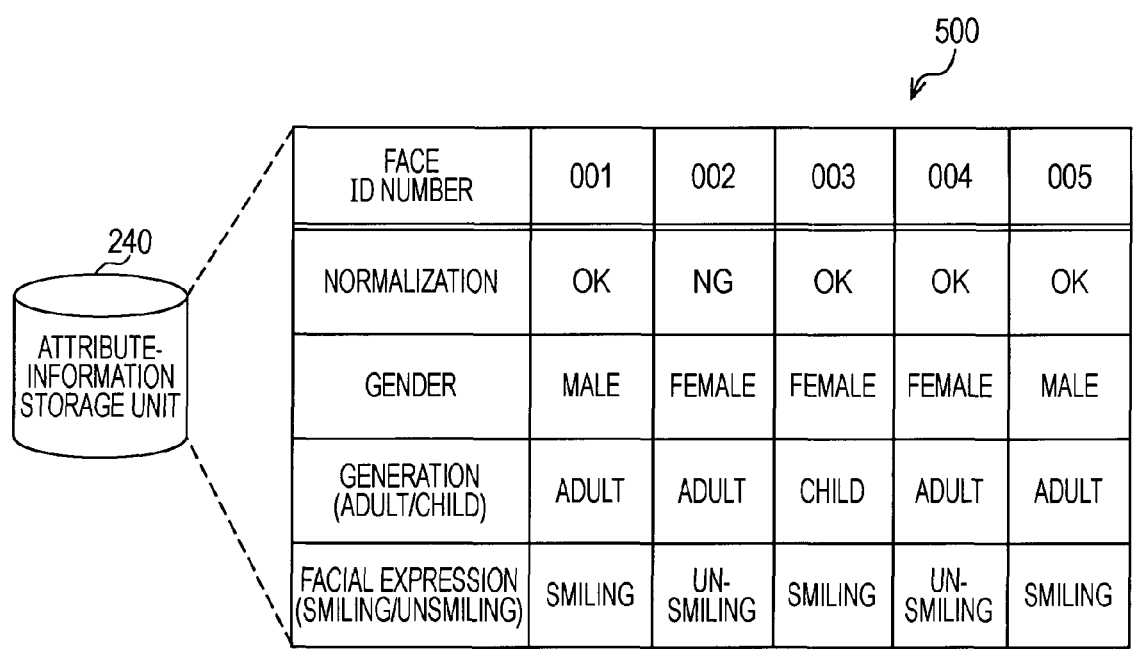
FIG. 7 is a diagram illustrating an attribute information set 500 stored in an attribute-information storage unit 240.

FIG. 7 is a diagram showing an attribution information set 500 stored in the attribute-information storage unit 240. As shown in FIGS. 6A and 6B, a plurality of attribution information blocks are generated on the basis of the results of determinations on each normalized face image. Those attribute information blocks are stored in relation to the respective face images in the attribute-information storage unit 240. For example, face identification (ID) numbers "001" to "005" for identifying a face image are assigned to the respective face images. Those face ID numbers and various attribute information blocks are stored as the attribute information set 500 such that each face ID number is associated with attribute information blocks related to the corresponding face image. For instance, it is assumed that the face ID number "001" is assigned to the face image 410 corresponding to the normalized face image 420 shown in FIGS. 5C and 6A, and the face ID number "002" is assigned to the face image 430 corresponding to the normalized face image 440 shown in FIGS. 5C and 6B. In this case, the same results of determinations contained in the attribute information set 450 shown in FIG. 6A are stored in respective fields below the face ID number "001". In addition, the same results of determinations contained in the attribute information set 460 shown in FIG. 6B are stored in respective fields below the face ID number "002". Various applications can be performed using information blocks contained in the attribute information set 500.

For example, when the operation reception unit 150 receives an operation input to give an instruction to display a list of female face images on the display unit 190, only female face images are extracted from face images stored in the face-image storage unit 210 using the attribute information blocks concerning "gender", i.e., indicating "male" or "female" out of the attribute information blocks stored as the attribute information set 500 under the control of the display control unit 180, so that a list of the female face images can be displayed on the display unit 190. For example, face images corresponding to the face ID numbers "002", "003", and "004" are extracted and are displayed on the display unit 190. However, the face 404 included in the face image 430 corresponding to the face ID number "002" is the male face as shown in FIGS. 5A and 5B. In this case, the list of female face images displayed on the display unit 190 includes the male face.

In the attribute information set 500, therefore, the attribute information block indicating "normalization: NG" is not used because it is unreliable. Only the attribute information blocks indicating "normalization: OK" can be used.

For example, when the operation reception unit 150 receives an operation input to give an instruction to display a list of female face images on the display unit 190, only female face images are extracted from face images stored in the face-image storage unit 210 using the attribute information blocks indicating "normalization: OK" associated with the face ID numbers "001", "003", "004", and "005" without using the attribute information block indicating "normalization: NG" associated with the face ID number "002" in the attribute information set 500. The list of female face images is displayed on the display unit 190. Consequently, the list of female face images displayed on the display unit 190 can be prevented from including a male face. Furthermore, the value of the score S calculated in determination may be stored as an attribute information block concerning "normalization" in the attribute information set 500. The use of each image may be changed according to the score S.

An operation of the image processor 100 according to the present embodiment of the present invention will be described with reference to FIGS. 8 to 10.

Figure 8:
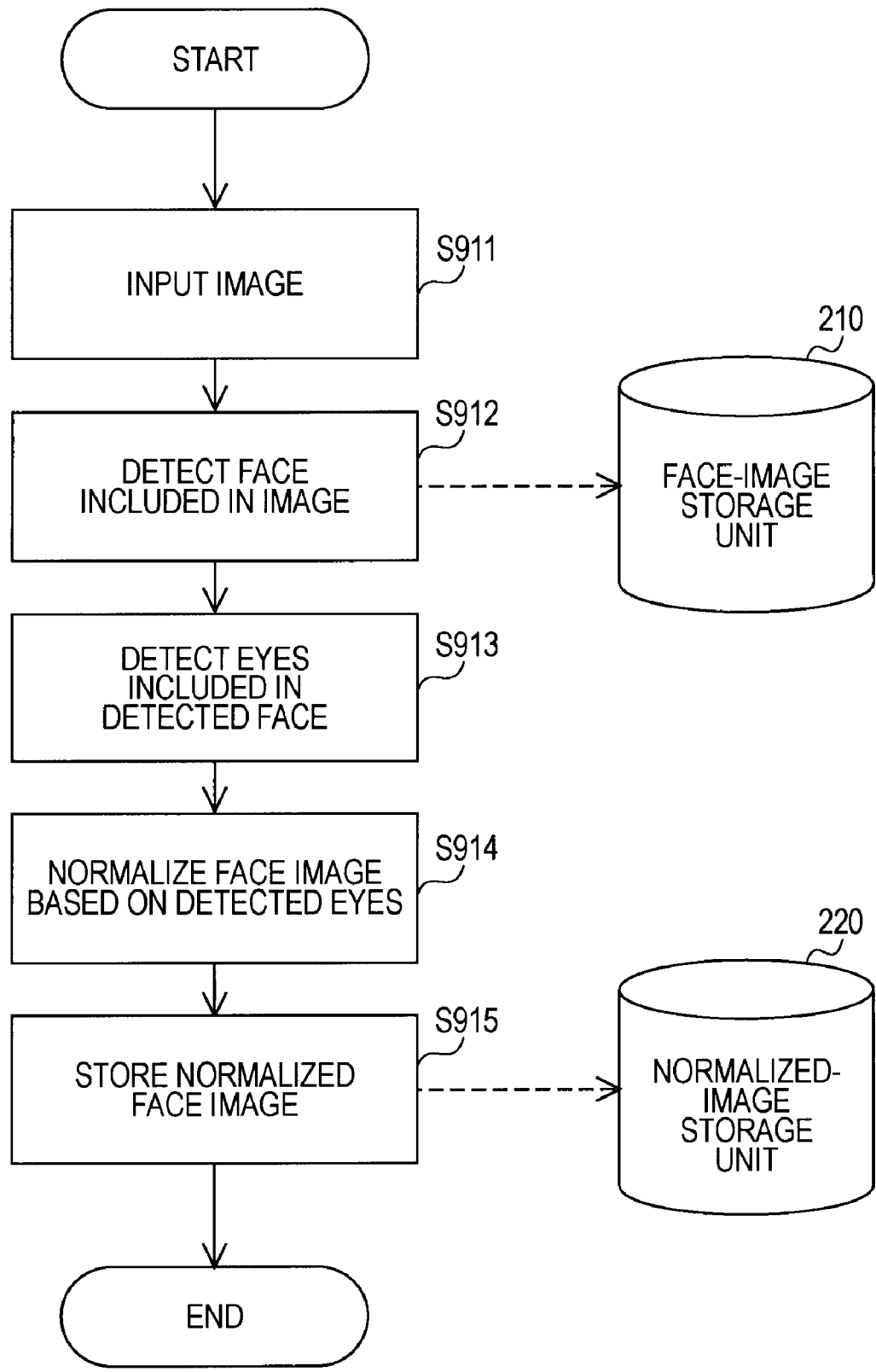
FIG. 8 is a flowchart of a process of generating a normalized face image by the image processor 100.

FIG. 8 is a flowchart of a process of generating a normalized face image by the image processor 100.

First, an image is input (step S911). Subsequently, a face included in the input image is detected and a face image including the detected face is stored into the face-image storage unit 210 (step S912). Both eyes included in the detected face are detected (step S913). The face image is normalized on the basis of the positions of the detected eyes (step S914). For example, as shown in FIG. 2B, the normalized face image 260 is generated by normalizing the face image 250. After that, the generated normalized face image is stored into the normalized-image storage unit 220 (step S915).

Figure 9:
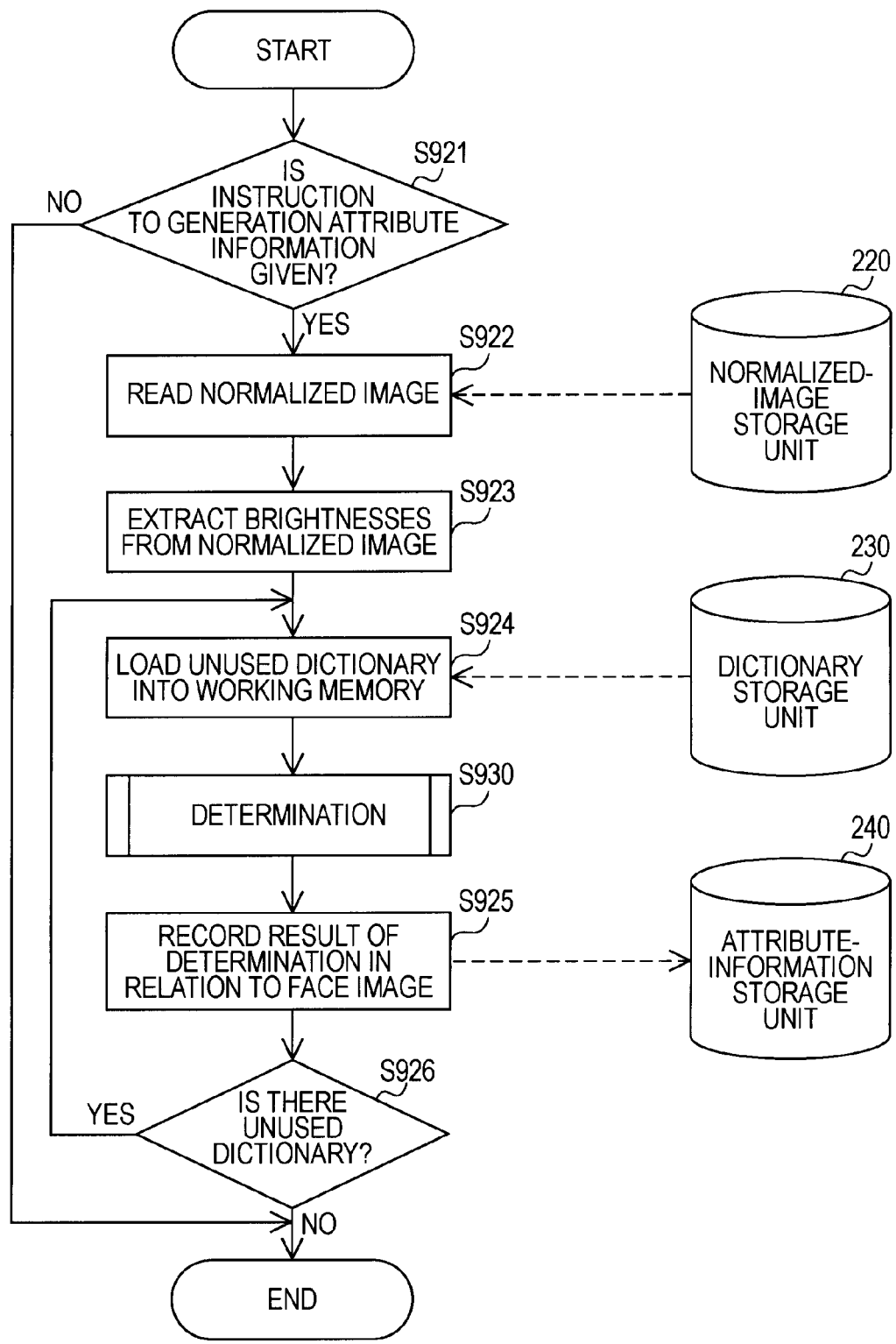
FIG. 9 is a flowchart of a process of generating attribute information related to a face by the image processor 100.

FIG. 9 is a flowchart of a process of generating attribute information related to a face by the image processor 100. The following description relates to a case where a determination is made when the operation reception unit 150 receives an operation input corresponding to an instruction to generate attribute information related to a face. In addition, the following description relates to a case where all of determination dictionaries are used to generate a plurality of attribute information blocks. An individual attribute information block may be generated in response to an operation input received by the operation reception unit 150.

First, a determination is made as to whether an instruction to generate attribute information related to a face is given (step S921). When any instruction to generate attribute information related to a face is not given (NO in step S921), the process of generating attribute information related to a face is terminated. Whereas, when the instruction to generate attribute information related to a face is given (YES in step S921), a stored normalized face image is read from the normalized-image storage unit 220 (step S922). Subsequently, brightnesses are extracted from the read normalized face image (step S923). After that, a determination dictionary that is not yet used for determination is loaded into the working memory 231 from the dictionary storage unit 230 which stores a plurality of determination dictionaries (step S924). For example, the normalization determination dictionary 310 is loaded out of the respective determination dictionaries shown in FIG. 3. Subsequently, a determination is made using the loaded determination dictionary (step S930). The determination will be described in detail later with reference to FIG. 10.

The result of determination is stored as attribute information related to the face subjected to the determination into the attribute-information storage unit 240 (step S925). Subsequently, a determination is made as to whether any of the determination dictionaries stored in the dictionary storage unit 230 is not yet used for determination (step S926). When there is an unused determination dictionary (YES in step S926), the process is returned to step S924 and the processing steps, i.e., steps S924 to S926 and S930 are repeated to generate attribute information related to the same face. Whereas, when there is no unused determination dictionary (NO in step S926), the process of generating attribute information related to the face is terminated.

Figure 10:
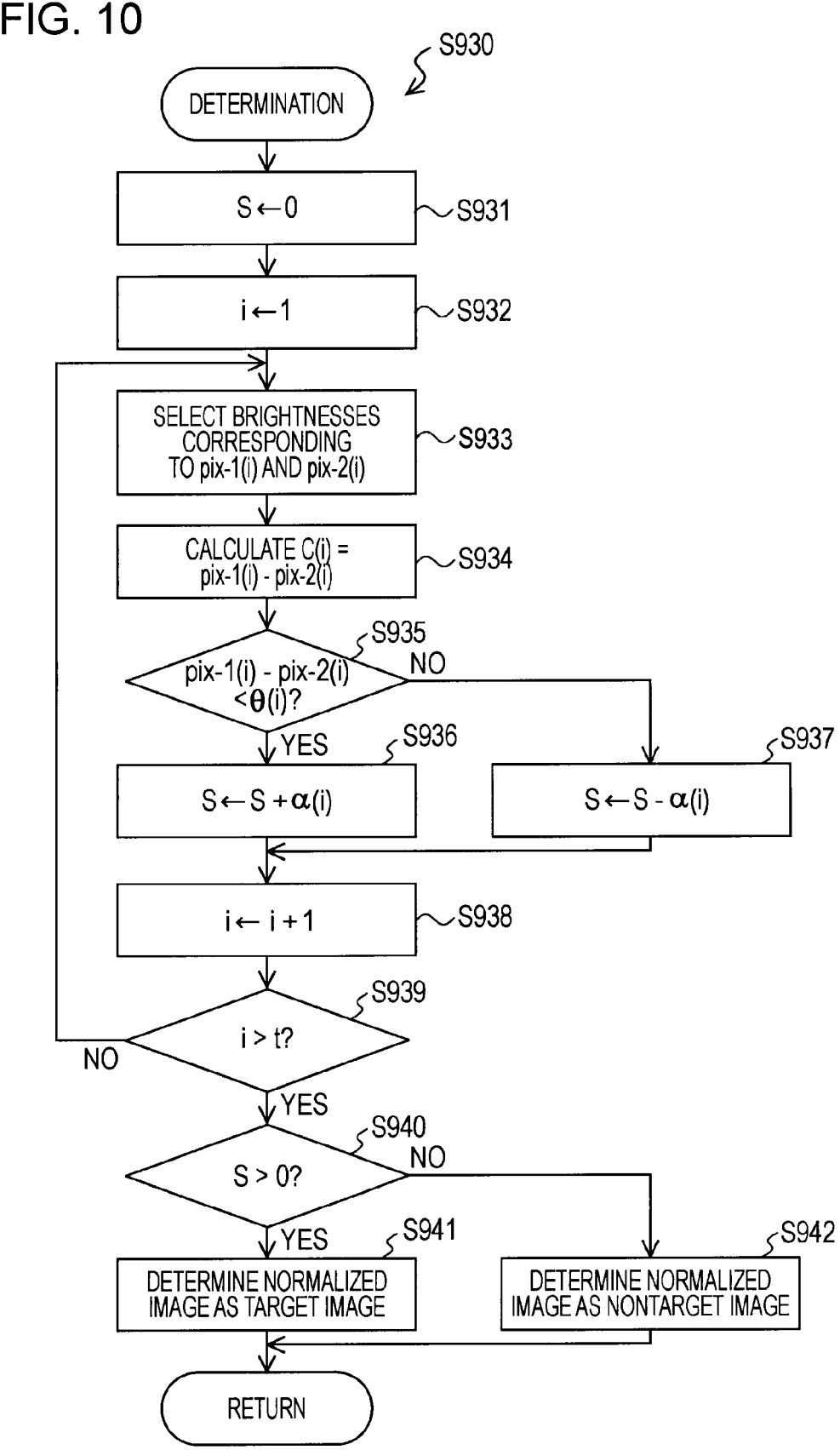
FIG. 10 is a flowchart of a process performed in step S930 in FIG. 9.

FIG. 10 is a flowchart of a process of determination (step S930 in FIG. 9) in the process of generating attribute information related to a face by the image processor 100. The present embodiment of the present invention will be described with respect to a determination as to whether a normalized face image is a target image.

First, the score S is initialized to "0" (step S931). The variable i is initialized to "1" (step S932). Subsequently, brightnesses corresponding to the positions pix-1 $(x, y)$ and pix-2 $(x, y)$ in the i-th row of the determination dictionary loaded in the working memory 231 in step S924 (refer to FIG. 9) are selected out of brightnesses extracted from the normalized face image in step S923 (refer to FIG. 9) (step S933). After that, the difference $C(i)$ is calculated with the two selected brightnesses using Expression (1) (step S934).

Subsequently, a determination is made as to whether the calculated difference $C(i)$ between the two brightnesses is less than the threshold $\theta(i)$ (step S935). When the difference $C(i)$ is less than the threshold $\theta(i)$ (YES in step S935), the weight $\alpha(i)$ is added to the score S (step S936). Whereas, when the difference $C(i)$ is not less than the threshold $\theta(i)$ (NO in step S935), the weight $\alpha(i)$ is subtracted from the score S (step S937).

After that, a value of "1" is added to the variable i (step S938). A determination is made as to whether the variable i is greater than the upper limit t (step S939). When the variable i is not greater than the upper limit t (NO in step S939), this means that the determination using the values in each row of the determination dictionary loaded in step S923 (refer to FIG. 9) is not finished. Accordingly, the process is returned to step S933 and steps S933 to S939 are repeated using the same determination dictionary. Whereas, when the variable i is greater than the upper limit t (YES in step S939), this means that the determination using the values in each row of the determination dictionary loaded in step S923 (see FIG. 9) is finished. Accordingly, the process proceeds to step S940. A determination is made as to whether the score S is greater than 0 (step S940).

When the score S is greater than 0 (YES in step S940), the normalized face image subjected to the determination is determined as a target image (step S941). Whereas, when the score S is not greater than 0 (NO in step S940), the normalized face image subjected to the determination is determined as a nontarget image (step S942). After that, the process is returned to step S930 in FIG. 9.

As described above, according to the present embodiment of the present invention, the respective determination dictionaries stored in the dictionary storage unit 230 have the same structure, the normalization unit 140 normalizes a face image subjected to determination so that a normalized face image has a predetermined resolution, and a feature amount for determination is standardized to the difference between brightnesses at two points of the normalized image. Consequently, any of the determination dictionaries can be switched to another one and a plurality of attribution information blocks can be generated according to the same algorithm. Advantageously, since a plurality of attribution information blocks related to a detected face can be generated while the image determination unit 170 switches any of the determination dictionaries to another one, the apparatus can be simplified, thus reducing calculation time for generation of attribution information blocks. In other words, attribute information blocks related to a face included in an image can be efficiently generated. Furthermore, the cost of the apparatus can be remarkably reduced.

In addition, a determination is made using the normalization determination dictionary 310 stored in the dictionary storage unit 230 as to whether the normalization of a normalized face image is successful, and the result of determination can be stored as an attribute information block related to the face image into the attribute-information storage unit 240 in a manner similar to generation of another attribute information block. Consequently, for example, when face images stored in the face-image storage unit 210 are displayed on the display unit 190, the face images can be displayed on the basis of only attribute information blocks indicating "normalization: OK" without using an attribute information block indicating "normalization: NG" because the attribute information block "normalization: NG" is unreliable. Thus, the face images can be displayed using higher-accuracy attribute information blocks. In addition, when the result of determination on the normalization of a normalized face image is "NG", the generation of another attribute information block related to the normalized face image can be stopped. Advantageously, high-accuracy attribute information blocks can be rapidly generated.

The present embodiment of the present invention has been described with respect to the case where the attribute information blocks concerning "normalization", "gender", "generation (adult/child)", and "facial expression (smiling/unsmiling)" are generated in relation to a face. The present embodiment of the present invention may be applied to a case where another attribute information block related to a face is generated. Other attribute information blocks related to a face may include, for example, the positions of both eyes of the face, the open/close states of the eyes, facial expression, ethnicity, a face shooting condition, and face orientation. The present embodiment of the present invention has been described with respect to the case where the respective determination dictionaries stored in the dictionary storage unit 230 are used as evaluation information sets for determinations as to whether a normalized face image is a target image. Another evaluation information set, whereby a determination can be made as to whether a normalized face image is a target image, may be used.

The present embodiment of the present invention has been described with respect to the case where the face of a person included in an image is detected and a plurality of attribution information blocks related to the detected face are generated. The present embodiment of the present invention may be applied to a case where another object other than a human face is detected in an image and a plurality of attribute information blocks related to the detected object are generated. Other objects other than the face of a human included in an image may include, for example, the face of a pet, such as a cat or a dog, and the face of an animal, such as a horse or a cow.

The present embodiment of the present invention has been described with respect to the image processor. The present embodiment of the present invention may be applied to an image display apparatus, such as a portable terminal, and an imaging apparatus, such as a digital still camera, which are capable of inputting and displaying an image, such as a moving image or a still image.

The embodiment of the present invention is an example for embodying the present invention. Although there is the correspondence between the features of the claims and the specific elements in the embodiment of the present invention, as will be described later, the present invention is not limited to the embodiment. It should be understood by those skilled in the art that various modifications, combinations, sub-combinations and alterations may occur depending on design requirements and other factors insofar as they are within the scope of the appended claims or the equivalents thereof.

In other words, the image processor 100 corresponds to, for example, an image processing apparatus according to a first embodiment of the present invention. The image processor 100 also corresponds to, for example, an image display apparatus according to a second embodiment of the present invention. The image processor 100 further corresponds to, for example, an imaging apparatus according to a third embodiment of the present invention.

The dictionary storage unit 230 corresponds to, for example, evaluation information storage means according to each of the first to third embodiments of the present invention. The image input unit 110 corresponds to, for example, image input means according to each of the first to third embodiments of the present invention. The face detection unit 120 corresponds to, for example, face detection means according to each of the first to third embodiments of the present invention.

The normalization unit 140 corresponds to, for example, normalization means according to each of the first to third embodiments of the present invention.

The feature extraction unit 160 corresponds to, for example, feature extraction means according to each of the first to third embodiments of the present invention.

The image determination unit 170 corresponds to, for example, attribution information generation means according to each of the first to third embodiments of the present invention.

The eye detection unit 130 corresponds to, for example, facial feature detection means according to the first embodiment of the present invention.

The display unit 190 corresponds to, for example, display means according to the second embodiment of the present invention. The display control unit 180 corresponds to, for example, display control means according to the second embodiment of the present invention.

Step S911 corresponds to, for example, an image input step according to each of fourth and fifth embodiments of the present invention. Step S912 corresponds to, for example, a face detecting step according to each of the fourth and fifth embodiments of the present invention. Step S914 corresponds to, for example, a normalizing step according to each of the fourth and fifth embodiments of the present invention. Step S923 corresponds to, for example, a feature extracting step according to each of the fourth and fifth embodiments of the present invention. Step S930 corresponds to, for example, an attribute information generating step according to each of the fourth and fifth embodiments of the present invention.

Processing steps described in the foregoing embodiment of the present invention may be regarded as a method including those processing steps, a program that allows a computer to execute those processing steps, or a recording medium that stores the program.

What is claimed is:

1. An image processing apparatus comprising:
   means for storing a plurality of evaluation information sets for determinations as to whether a face image is a target image, each of the evaluation information sets identifying at least two positions in the face image;
   means for inputting an image;
   means for detecting a face included in the input image;
   means for normalizing the face image that is an image segment including the detected face so that the face image has a predetermined resolution;
   means for extracting brightness values of the normalized face image at the two positions identified in each of the evaluation information sets; and
   means for calculating a difference between the brightness values of the normalized face image at the two positions identified in each of the evaluation information sets, and making a determination on the basis of the calculated difference and each evaluation information set stored in the means for storing as to whether the face image is the target image associated with the evaluation information set, and generating an attribute information block related to the face included in the face image as a result of the determination.

2. The apparatus according to claim 1, wherein
   the evaluation information sets each include a combination of a position in the face image and a threshold, and
   the means for calculating makes a determination on the basis of the brightness values of the normalized face image corresponding to the position included in each evaluation information set and the threshold associated with the position as to whether the face image is the target image associated with the evaluation information set.

3. The apparatus according to claim 1, wherein
   the evaluation information sets each include a combination of two positions in the face image and a threshold, and
   the means for calculating calculates the difference between the brightness values of the normalized face image corresponding to the two positions associated with the combination included in each evaluation information set, compares the calculated difference with the threshold associated with the combination, and makes a determination on the basis of a result of comparison as to whether the face image is the target image associated with the evaluation information set.

4. The apparatus according to claim 1, wherein
   the evaluation information sets each contain a plurality of combinations each including two positions in the face image and a threshold, and
   the means for calculating calculates the difference between the brightness values of the normalized face image corresponding to the two positions associated with each of the combinations contained in each evaluation information set, compares the calculated difference with the threshold associated with the combination, and makes a determination on the basis of results of comparisons as to whether the face image is the target image associated with the evaluation information set.

5. The apparatus according to claim 1, wherein
   the evaluation information sets each contain a plurality of combinations each including two positions in the face image, a threshold, and a weight; and
   the means for calculating calculates the difference between the brightness values of the normalized face image corresponding to the two positions associated with each of the combinations contained in each evaluation information set, compares the calculated difference with the threshold associated with the combination, adds or subtracts the weight on the basis of a result of comparison to obtain a sum of values associated with the combinations contained in the evaluation information set, and makes a determination on the basis of the sum as to whether the face image is the target image associated with the evaluation information set.

6. The apparatus according to claim 1, wherein
   at least one of the plurality of evaluation information sets stored in the means for storing is a set of normalization determination information for a determination as to whether the normalization of the normalized face image is successful, and
   the means for calculating makes a determination on the basis of the normalization determination information set stored in the means for storing as to whether the normalization of the normalized face image is successful, and generates an attribute information block related to the face included in the face image as a result of determination.

7. The apparatus according to claim 6, wherein when determining that the normalization of the normalized face image is unsuccessful, the means for calculating stops generating another attribute information block related to the face included in the face image.

8. The apparatus according to claim 1, further comprising: means for detecting at least one feature included in the detected face, wherein the means for normalizing normalizes the face image of the detected face on the basis of a position of the detected feature.

9. The apparatus according to claim 8, wherein
   the means for detecting includes means for detecting both eyes of the detected face, and
   the means for normalizing normalizes the face image of the detected face on the basis of positions of the detected eyes.

10. The apparatus according to claim 8, wherein the means for normalizing performs affine transformation on the face image of the detected face on the basis of a position of the detected feature.

11. The apparatus according to claim 1, wherein a plurality of attribute information blocks, generated by the means for calculating, include at least two of information blocks concerning positions of both eyes of the face, open/close states of the eyes, facial expression, gender, generation, ethnicity, a face shooting condition, and face orientation.

12. An image display apparatus comprising:
   means for storing a plurality of evaluation information sets for determinations as to whether a face image is a target image, each of the evaluation information sets identifying at least two positions in the face image;
means for inputting an image;
means for detecting a face included in the input image;
means for displaying the face image that is an image segment including the detected face;
means for normalizing the face image so that the face image has a predetermined resolution;
means for extracting brightness values of the normalized face image at the two positions identified in each of the evaluation information sets; and
means for calculating a difference between the brightness values of the normalized face image at the two positions identified in each of the evaluation information sets, and making a determination on the basis of the calculated difference and each evaluation information set stored in the means for storing as to whether the face image is the target image associated with the evaluation information set, and generating an attribute information block related to the face included in the face image as a result of the determination; and
means for controlling display of the face image on the means for displaying on the basis of the generated attribute information blocks.

13. An imaging apparatus comprising:
means for storing a plurality of evaluation information sets for determinations as to whether a face image is a target image, each of the evaluation information sets identifying at least two positions in the face image;
means for inputting an image obtained by capturing an object;
means for detecting a face included in the input image;
means for normalizing the face image that is an image segment including the detected face so that the face image has a predetermined resolution;
means for extracting brightness values of the normalized face image at the two positions identified in each of the evaluation information sets; and
means for calculating a difference between the brightness values of the normalized face image at the two positions identified in each of the evaluation information sets, and making a determination on the basis of the calculated difference and each evaluation information set stored in the means for storing as to whether the face image is the target image associated with the evaluation information set, and generating an attribute information block related to the face included in the face image as a result of the determination.

14. A method for image processing for an image processing apparatus including an evaluation information storage section storing a plurality of evaluation information sets for determinations as to whether a face image is a target image, each of the evaluation information sets identifying at least two positions in the face image, the method comprising:
inputting an image;
detecting a face included in the input image;
normalizing the face image that is an image segment including the detected face so that the face image has a predetermined resolution;
extracting brightness values of the normalized face image at the two positions identified in each of the evaluation information sets; and
calculating a difference between the brightness values of the normalized face image at the two positions identified in each of the evaluation information sets, and making a determination on the basis of the calculated difference and each evaluation information set stored in the evaluation information storage section as to whether the face image is the target image associated with the evaluation information set, and generating an attribute information block related to the face included in the face image as a result of the determination.

15. A non-transitory computer readable storage medium storing computer readable instructions thereon, which, when executed by a computer, cause the computer to execute a method for image processing for an image processing apparatus including an evaluation information storage section storing a plurality of evaluation information sets for determinations as to whether a face image is a target image, each of the evaluation information sets identifying at least two positions in the face image, the method comprising:
inputting an image;
detecting a face included in the input image;
normalizing the face image that is an image segment including the detected face so that the face image has a predetermined resolution;
extracting brightness values of the normalized face image at the two positions identified in each of the evaluation information sets; and
calculating a difference between the brightness values of the normalized face image at the two positions identified in each of the evaluation information sets, and making a determination on the basis of the calculated difference and each evaluation information set stored in the evaluation information storage section as to whether the face image is the target image associated with the evaluation information set, and generating an attribute information block related to the face included in the face image as a result of the determination.

16. An image processing apparatus comprising:
an evaluation information storage section including a memory storing a plurality of evaluation information sets for determinations as to whether a face image is a target image, each of the evaluation information sets identifying at least two positions in the face image;
an image input section inputting an image;
a face detection section detecting a face included in the input image;
a normalization section normalizing the face image that is an image segment including the detected face so that the face image has a predetermined resolution;
a feature extraction section extracting brightness values of the normalized face image at the two positions identified in each of the evaluation information sets; and
an attribute information generation section calculating a difference between the brightness values of the normalized face image at the two positions identified in each of the evaluation information sets, and making a determination on the basis of the calculated difference and each evaluation information set stored in the evaluation information storage section as to whether the face image is the target image associated with the evaluation information set, and generating an attribute information block related to the face included in the face image as a result of the determination.

17. An image display apparatus comprising:
an evaluation information storage section including a memory storing a plurality of evaluation information sets for determinations as to whether a face image is a target image, each of the evaluation information sets identifying at least two positions in the face image;
an image input section inputting an image;
a face detection section detecting a face included in the input image;

a display section displaying the face image that is an image segment including the detected face;

a normalization section normalizing the face image so that the face image has a predetermined resolution;

a feature extraction section extracting brightness values of the normalized face image at the two positions identified in each of the evaluation information sets; and an attribute information generation section calculating a difference between the brightness values of the normalized face image at the two positions identified in each of the evaluation information sets, and making a determination on the basis of the calculated difference and each evaluation information set stored in the evaluation information storage section as to whether the face image is the target image associated with the evaluation information set, and generating an attribute information block related to the face included in the face image as a result of the determination; and display control section controlling display of the face image on the display section on the basis of the generated attribute information blocks.

18. An imaging apparatus comprising:

an evaluation information storage section including a memory storing a plurality of evaluation information sets for determinations as to whether a face image is a target image, each of the evaluation information sets identifying at least two positions in the face image;

an image input section inputting an image obtained by capturing an object;

a face detection section detecting a face included in the input image;

a normalization section normalizing the face image that is an image segment including the detected face so that the face image has a predetermined resolution;

a feature extraction section extracting a feature amount of the normalized face image; and an attribute information generation section calculating a difference between the brightness values of the normalized face image at the two positions identified in each of the evaluation information sets, and making a determination on the basis of the calculated difference and each evaluation information set stored in the evaluation information storage section as to whether the face image is the target image associated with the evaluation information set, and generating an attribute information block related to the face included in the face image as a result of the determination.

* * * * *